(12) United States Patent
DeMeritt et al.

(10) Patent No.: US 7,817,884 B2
(45) Date of Patent: Oct. 19, 2010

(54) STRAIN-MANAGED OPTICAL WAVEGUIDE ASSEMBLIES AND METHODS OF FORMING SAME

(75) Inventors: Jeffery Alan DeMeritt, Painted Post, NY (US); Stuart Gray, Corning, NY (US); Daniel Warren Hawtof, Corning, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/980,072

(22) Filed: Oct. 30, 2007

(65) Prior Publication Data

US 2009/0110355 A1 Apr. 30, 2009

(51) Int. Cl.
*G02B 6/26* (2006.01)
*G02B 6/14* (2006.01)
*H01S 3/067* (2006.01)

(52) U.S. Cl. .................. 385/29; 385/32; 359/341.1
(58) Field of Classification Search .............. 385/29, 385/32
See application file for complete search history.

(56) References Cited

U.S. PATENT DOCUMENTS

| | | | | |
|---|---|---|---|---|
| 4,153,332 A | | 5/1979 | Longoni | 350/96.23 |
| 4,697,869 A | * | 10/1987 | So et al. | 385/140 |
| 4,812,001 A | | 3/1989 | Tomita et al. | 350/96.3 |
| 5,339,378 A | * | 8/1994 | Simonds et al. | 385/100 |
| 5,452,393 A | | 9/1995 | Stowe et al. | 385/123 |
| 5,851,259 A | | 12/1998 | Clayton et al. | 65/377 |
| 6,789,950 B1 | | 9/2004 | Loder et al. | 385/53 |
| 7,266,259 B1 | * | 9/2007 | Sumetsky | 385/12 |
| 7,648,290 B2 | * | 1/2010 | Feve et al. | 385/93 |
| 2002/0012504 A1 | | 1/2002 | Gillham et al. | 385/86 |
| 2006/0257086 A1 | * | 11/2006 | Ohsono et al. | 385/123 |
| 2008/0095199 A1 | * | 4/2008 | Abramczyk | 372/6 |

FOREIGN PATENT DOCUMENTS

| | | | | |
|---|---|---|---|---|
| GB | 2223576 A | * | 4/1990 | |
| JP | 63061206 A | * | 3/1988 | |
| WO | WO01/67145 | | 9/2001 | |
| WO | WO2004/100406 | | 11/2004 | |

* cited by examiner

*Primary Examiner*—Michelle R Connelly Cushwa
(74) *Attorney, Agent, or Firm*—Gregory V. Bean (57) ABSTRACT

The strain-managed optical waveguide assemblies of the present invention utilize a large-mode-area (LMA) optical fiber that is annealed in a first bending such that the fiber in that configuration has substantially no axial strain. A fiber support member is then used to support the annealed LMA optical fiber in a second bending configuration that forms within the LMA optical fiber an axial strain profile that reduces stimulated Brillouin scattering (SBS) as compared to the first bending configuration, and that also preferably causes the LMA optical fiber to operate in a single mode. The LMA optical fiber may have a double-clad configuration and include a doped core that serves as a gain medium. The strain-managed optical waveguide assembly can then be used to constitute a fiber amplifier that mitigates the SBS penalty associated with high-power fiber-based optical systems. The strain-managed waveguide assembly can also provide for thermal management in high-power applications, and can be used to control SBS by controlling the temperature profile along the length of the LMA optical fiber in a manner that mitigates SBS.

25 Claims, 9 Drawing Sheets

FIRST BENDING CONFIGURATION
FIG. 6A

SECOND BENDING CONFIGURATION
FIG. 6B

FIRST BENDING CONFIGURATION
FIG. 6C

SECOND BENDING CONFIGURATION
FIG. 6D

FIRST BENDING CONFIGURATION
FIG. 6E

SECOND BENDING CONFIGURATION
FIG. 6F

STRAIN-MANAGED OPTICAL WAVEGUIDE ASSEMBLIES AND METHODS OF FORMING SAME

This invention was made with Government support under Agreement No. MDA-972-02-03-0004 awarded by Defense Advanced Research Projects Agency (DARPA). The Government maintains certain rights in this invention.

BACKGROUND OF THE INVENTION

1. Field of the Invention

The present invention relates generally to optical waveguide assemblies, and in particular relates to such assemblies that use large-mode-area optical fibers having reduced stimulated Brillouin scattering.

2. Technical Background

Optical waveguides support one or more optical guided modes and are used in a variety of optical systems and applications. Optical fibers are one type of optical waveguide and are used to carry large amounts of information over long distances in telecommunication systems. Optical fibers are also use to carry large amounts of optical power in fiber amplifiers and fiber laser systems.

Stimulated Brillouin Scattering (SBS) is a dominant non-linear penalty in many optical-fiber-based transmission systems. SBS occurs when an input lightwave traveling through the fiber generates an acoustic wave through the process of electrostriction. The acoustic wave causes a periodic modulation of the fiber refractive index, which operates as a Bragg grating from which photons can be scattered. The result is selective amplification of a slightly frequency-downshifted lightwave (Stokes wave) that propagates in the direction opposite of the input lightwave.

In many fiber-based optical systems, launching large amounts of optical power into the fiber while maintaining a high signal-to-noise ratio (SNR) is desirable. However, as the launch power or signal power of the incident signal increases, it may exceed the SBS threshold power and cause part of the signal power to reflect back to the transmitter due to SBS. In addition, the scattering process increases the noise level at the signal wavelength. The combination of decrease in signal power and increase in the noise lowers the SNR and leads to performance degradation of the optical system. To first order, SBS is an increasing function of $1/\lambda$ so that its effects are particularly problematic for relatively short-wavelength (and in particular, ultraviolet (UV)) applications.

There are a number of ways to mitigate SBS effects. One approach involves changing the concentration of fluorine dopant along the fiber length, which is not always possible or desirable. Another approach involves providing the fiber with an axially varying strain profile. Another approach involves increasing the source bandwidth. Yet another approach is to vary the temperature along the length of the fiber. These approaches are largely independent of system size.

Besides SBS, there are other obstacles to obtaining good optical performance from high-power fiber-based systems, such as the availability of sufficient pump power, and thermal management. With respect to the latter, optical fibers are not 100% efficient and absorb some of the input light. This light is converted to heat, which must be removed from the system to prevent damaging the system or to prevent performance degradation. While these obstacles can generally be overcome by increasing the system size, they are problematic if the system needs to be compact. Unfortunately, most high-power waveguide-based systems need to be compact so that they can readily fit into relatively small enclosures when deployed in the field.

Many high-power fiber-based systems employ large mode area (LMA) optical fibers that normally support multiple modes but are made to operate in single mode. Single-mode operation provides for a diffraction-limited output beam useful for a number of important applications, such as fiber amplifiers and fiber lasers. Because an LMA optical fiber typically supports multiple modes, single-mode operation is achieved by "mode stripping," wherein all modes, save for the fundamental mode, are forced out of the fiber. This is typically accomplished by subjecting the fiber to bending at a given radius. However, fiber bending at small radii can mechanically damage the fiber, can cause the light from the stripped modes to damage the optical fiber, and can also alter the strain profile and adversely influence the mitigating effect on SBS.

SUMMARY OF THE INVENTION

An aspect of the invention is a strain-managed waveguide assembly. The assembly includes a large-mode-area (LMA) optical fiber capable of supporting multiple modes and that has a first bending configuration wherein the LMA optical fiber has substantially no axial strain. The assembly also includes a mandrel configured to support the LMA optical fiber in a second bending configuration that forms within the LMA optical fiber an axial strain profile that reduces stimulated Brillouin scattering (SBS) as compared to the first bending configuration, and that also induces mode stripping that causes the LMA optical fiber to operate in a single mode.

Another aspect of the invention is a method of forming a strain-managed waveguide assembly. The method includes forming an LMA optical fiber capable of supporting multiple modes into a first bending configuration wherein the LMA optical fiber has substantially no axial strain. The method also includes forming the LMA optical fiber into a second bending configuration that creates an axial strain profile within the LMA optical fiber that reduces stimulated Brillouin scattering (SBS) as compared to the first bending configuration, and that also causes the LMA optical fiber to operate in a single mode.

Another aspect of the invention is an optical fiber amplifier for amplifying input light signals. The optical amplifier includes a large-mode-area (LMA) optical fiber having a core adapted to serve as a gain medium capable of amplifying the input light signals. The LMA optical fiber is capable of supporting multiple modes and has a first bending configuration wherein the LMA optical fiber has substantially no axial strain. The optical amplifier also includes a mandrel configured to support the LMA optical fiber in a second bending configuration that forms in the LMA optical fiber an axial strain profile that reduces stimulated Brillouin scattering (SBS) as compared to the first bending configuration, and that also causes the LMA optical fiber to operate in single mode. The optical amplifier also has a pump light source adapted to optically pump the gain medium.

Additional features and advantages of the invention will be set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

FIG. 11B is a plot of an example linear thermal gradient sustained along the length of the mandrel (X-direction) and thus in the LMA optical fiber supported thereby using the temperature control system illustrated in FIG. 11A;

DETAILED DESCRIPTION OF THE INVENTION

Reference is now made in detail to several exemplary embodiments of the invention, examples of which are illustrated in the accompanying drawings. Whenever possible, the same or similar reference numerals or symbols are used throughout the drawings to refer to the same or like parts.

The present invention is directed to practical, strain-managed waveguide assemblies for use in high-powered waveguide devices. The strain-managed waveguide assemblies described herein simultaneously provide for single-mode operation of a large-mode-area (LMA) optical fiber and a reduction in stimulated Brillouin scattering (SBS) without compromising fiber lifetime. Various embodiments of the strain-managed waveguide assembly also provide for thermal management in high-power applications. Other embodiments include temperature control of the LMA optical fiber to mitigate SBS.

The strain-managed waveguide assembly of the present invention has particular utility in those applications where it is desirable to independently control the curvature and strain of an LMA optical fiber when the fiber is used in a high-power fiber-based optical system such as an amplifier or a laser.

In the discussion below, $R_{B1}$ represents a "first bending radius" associated with a first bending configuration into which the LMA optical fiber is annealed. Radius $R_{B1}$ may be constant or may vary as a function of position (i.e., length L) along the LMA optical fiber. Likewise, $R_{B2}$ represents a "second bending radius" associated with a second bending configuration for the LMA optical fiber. Like radius $R_{B1}$, radius $R_{B2}$ may be constant or may vary as a function of position (length L) along the LMA optical fiber in the second bending configuration.

In addition, the term "annealed" is used in the present invention to signify heat-treating the LMA optical fiber so that there is substantially no residual strain in the optical fiber in the resulting configuration, which is referred to herein as the "first bending configuration."

Forming the First LMA Optical Fiber Bending Configuration

An aspect of the present invention involves forming an LMA optical fiber into a first bending configuration that has substantially no axial strain associated therewith. The strain exhibited in the LMA fiber as it is actually deployed is defined not by the deployed radius, as it would in an un-annealed fiber, but rather by the change of radius between the annealed and deployed configurations (i.e., between the "first" and "second" bending configurations). This radius difference creates a strain along the fiber axis (i.e., "axial strain"). In an example embodiment, this axial strain is made to vary along the fiber axis.

For good single-mode optical performance of an LMA optical fiber, the process of forming bends in the fiber must meet several criteria. First, the bending process must accommodate fibers having a relatively large diameter without causing the fibers to mechanically fail (which they are prone to do at small bending radii). The process must also maintain a minimum bending radius formed above some arbitrary maximum value. Further, the process must be capable of forming straight pigtails at both ends of the fiber without violating minimum bending radius requirements. In addition, the process must be run at low enough time-at-temperature to avoid diffusion of the LMA optical fiber core. Finally, the process should be adaptable to direct, off-the-draw forming.

Figure 1:
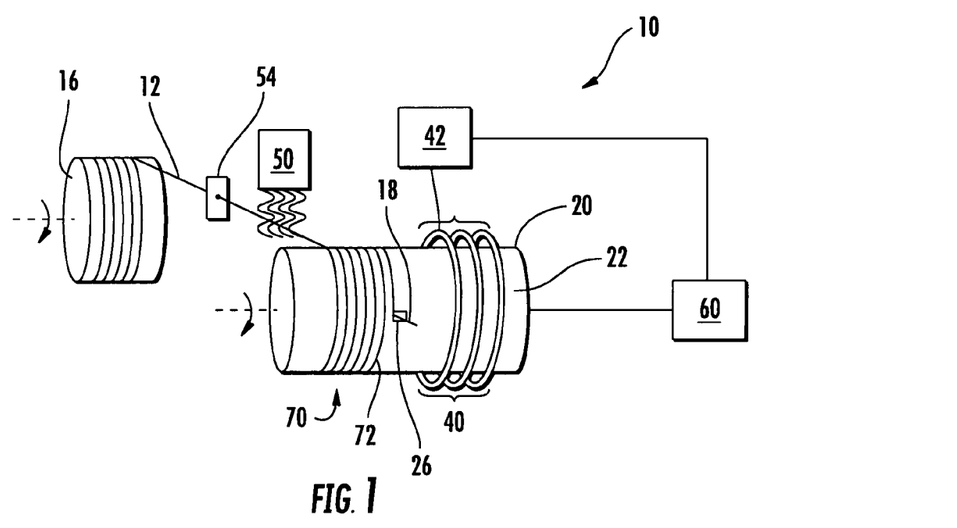
FIG. 1 is a schematic diagram of an example embodiment of a lathe-type fiber coiling apparatus for annealing a length of uncoated LMA optical fiber into the first bending configuration.

FIG. 1 is a schematic diagram of an example embodiment of a lathe-type fiber coiling apparatus 10 for carrying out the method of coiling a length of unannealed LMA optical fiber 12 into the first bending configuration according to the present invention. LMA optical fiber 12 is shown held in a spool 16.

Figure 2A:
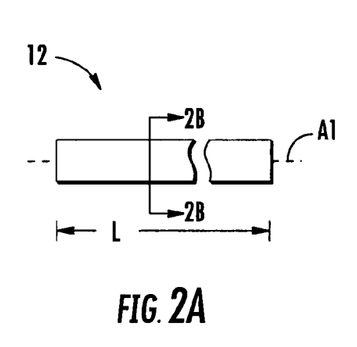
FIG. 2A is a schematic side view of the uncoated LMA optical fiber used in the apparatus of FIG. 1.
Figure 2B:
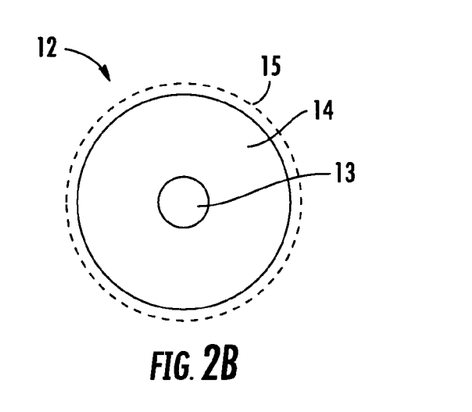
FIG. 2B is a schematic cross-sectional diagram of the uncoated LMA optical fiber of FIG. 2A as viewed along the line 2B-2B.

FIG. 2A is a schematic side view of LMA optical fiber 12, and FIG. 2B is a cross-sectional diagram of the LMA optical fiber of FIG. 2A viewed along the direction 2B-2B in FIG. 2A. LMA optical fiber 12 includes a central high-index core region ("core") 13 centered on a central axis A1. Core 13 is surrounded by a low-index cladding region ("cladding") 14. In an example embodiment, core 13 is adapted to operate as a gain medium, e.g., is doped with one or more rare-earth elements. LMA optical fiber 12 usually includes a coating 15 (dashed line) surrounding cladding 14. An organic-based coating 15, however, would not survive the annealing processes as described below. Instead, other types of coatings 15 are preferable, such as metal or carbon coatings. Alternatively, LMA optical fiber 12 is uncoated.

In an example embodiment, LMA optical fiber 12 has double clad structure. The double clad LMA fiber 12 has two cladding layers (an inner cladding and an outer cladding), with both cladding layers having a lower refractive index than the core, and the outer cladding having a lower refractive index than the inner cladding. Where core 13 serves as a rare-earth-doped gain medium, the double-clad structure allows the rare-earth dopants to be pumped by high-power broad-area laser diodes, with the pump light propagating in the inner cladding. Many LMA optical fibers use a low-index polymer for the outer cladding. However, such a cladding would need to be removed prior to the annealing process described below, and then reapplied afterwards to preserve the wave-guiding properties of the fiber. In an example embodiment, the example embodiment double-clad LMA optical fiber is an all-glass structure having an outer cladding made from a low-index glass that does not need to be removed from the LMA fiber prior to the annealing process.

With reference again to FIG. 1, apparatus 10 includes a rotating mandrel 20 having an outer surface 22. Mandrel 20 of FIG. 1 is shown as a constant-radius cylinder. However, other mandrel shapes, such as a tapered mandrel having a constantly varying radius, can also be used. In one example embodiment, mandrel 20 is formed from Pt and Rh (80/20), while in another example embodiment the mandrel is formed from Pt skin over alumina.

Mandrel 20 also includes a "fiber catcher" 26 (e.g., a hook) on outer surface 22 that is adapted to catch a hook formed on one end of the LMA optical fiber 12. In an example embodiment, mandrel 20 is inductively heated using heating coils 40 that surround a portion of the mandrel and that are powered by a radio frequency (RF) power source 42. A localized heat source 50, such as a gas flame, is arranged relative to mandrel 20, and an optical fiber tensioning device 54, which is adapted to provide tension to the LMA optical fiber as the fiber is feed from spool 16 to mandrel 20, is arranged relative to the localized heat source. Apparatus 10 includes a controller 60 for controlling the rotational speed of mandrel 20 as well as the temperature of the mandrel by controlling the amount of RF power provided by RF power unit 42 to heating coils 40.

In an example embodiment of forming LMA optical fiber 12 into its first bending configuration via annealing using apparatus 10, mandrel 20 is preheated to avoid cyclical variations in the coiling (bending) radius. One end of LMA optical fiber 12 is then taken from reel 16 and is formed as a hook 18 (see FIG. 3) This hook is made to engage fiber-catcher 26 on mandrel outer surface 22 when mandrel 20 is slowly rotating (e.g., @ 4 RPM). This allows LMA optical fiber 12 to engage mandrel surface 22 and be taken up thereby so that it wraps around the mandrel and forms a fiber coil.

As the mandrel starts to take up LMA optical fiber 12, the position of either localized heat source 50 or the LMA optical fiber is adjusted so that the LMA optical fiber is heated prior to it reaching mandrel 20. A typical temperature to which LMA optical fiber 12 is heated by localized heat source 50 is 800° C., which is sufficient to reduce residual strain in the LMA optical fiber to near zero while also avoiding unwanted diffusion from core 13. LMA optical fiber 12 is then captured by tensioning device 54, which provides a select amount of axial tension in the LMA optical fiber while the LMA optical fiber is taken up by mandrel 20.

When the desired length of LMA optical fiber 12 is taken up by mandrel 20, localized heat source 50 is turned off, the inductive heating of the mandrel is terminated, the mandrel rotation is stopped, and the tensioning apparatus is adjusted to release tension on the LMA optical fiber.

The resulting annealed LMA optical fiber 12—identified hereinbelow as 12' to distinguish it from its unannealed state—now has a coil section 70 with one or more coils 72. Annealed LMA optical fiber 12' is then removed from mandrel 20. Coil section 70 has a corresponding first bending radius $R_{B1}$, which in the present example is constant because mandrel 20 has a constant radius. At this point, annealed LMA optical fiber 12'—and particularly coil section 70—represents a first or initial bending configuration. The heating of LMA optical fiber 12 when forming this initial bending configuration results in there being substantially no axial strain in the resulting annealed LMA optical fiber 12'.

Figure 3:
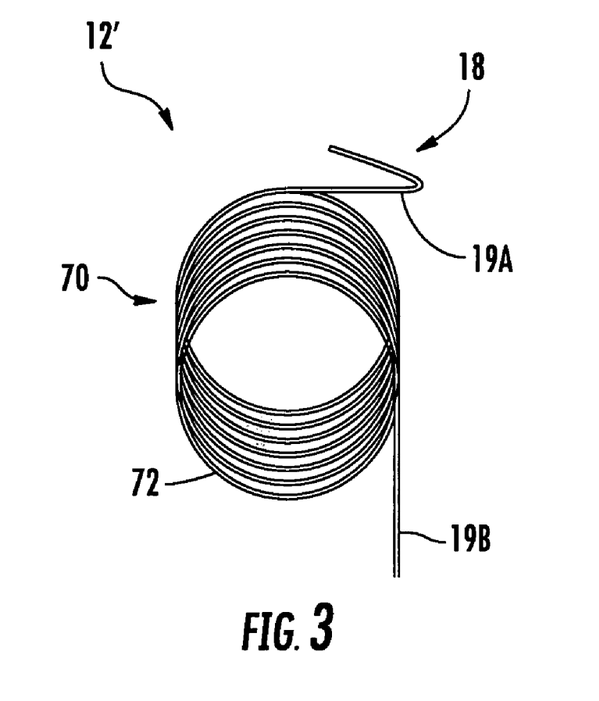
FIG. 3 is a perspective view of the annealed LMA optical fiber shown in a first bending configuration that includes a number of constant-radius coils formed using the apparatus of FIG. 1.
Figure 4:
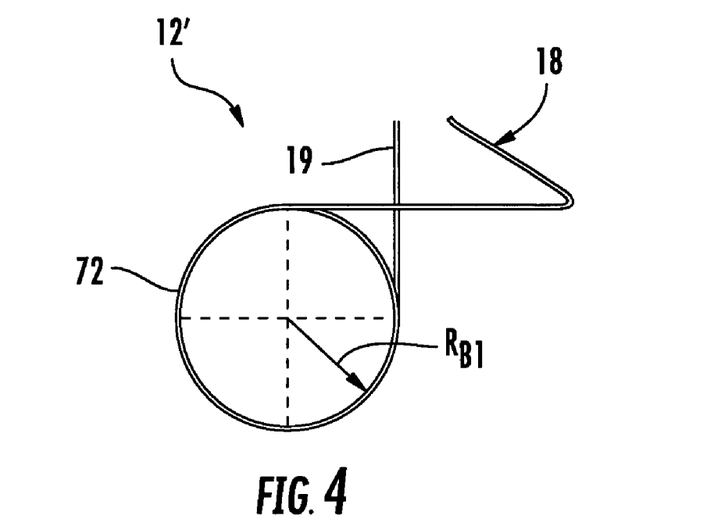
FIG. 4 is a side view of the LMA optical fiber of FIG. 3, illustrating a constant radius $R_{B1}$ of the coils.

FIG. 3 is a schematic perspective view and FIG. 4 is a schematic side view of an example annealed LMA optical fiber 12' with a number of coils 72 formed using the example apparatus and method described above. Hook 18 is shown at one end 19A of annealed LMA optical fiber 12', while the other fiber end 19B is straight and tangential to coils 72. FIG. 4 illustrates the first bending radius $R_{B1}$ associated with the constant-bend-radius coils 72 in coil section 70 for this example embodiment of a first bending configuration.

The above-described process has been carried out by the inventors to form annealed LMA optical fibers 12' having smooth, single-radius coils 72 with smooth tangential pigtails 19A and 19B at opposite ends of the LMA optical fiber. All-glass, double clad LMA optical fibers 12 with core diameters of up to 50 um and outer cladding diameters ranging from 500 um to 1 mm were used to form annealed LMA optical fibers 12' with coil sections 70 of up to 8 meters in length. The core of the LMA fiber was doped with 1 wt-% of ytterbium oxide ($Yb_2O_3$) to enable amplification of signals with wavelengths close to 1060 nm. Table 1 below provides example data for operating apparatus 10. The length of a coil section and the number of turns in a coil is a function of the overall length of the LMA fiber being annealed and the length of the pigtail. Tests were conducted with 10 to 50 cm pigtails coils ranging from 2" to 12" in length and containing between 8 and 20 turns.

TABLE 1

Example operating parameters for Apparatus 10

| | |
|---|---|
| Mandrel Diameter (=$R_{B1}$/2) | 2" to 8" |
| Mandrel Types | Constant-Radius Cylinder |
| | Tapered |
| | Alternating Taper and Constant Radius |
| Mandrel Materials | 80/20 Pt/Rh |
| | Pt/Rh or Pt skin over alumina tube |
| Mandrel Surface Speed | 22 to 46 inches per minute |
| Traverse Speed of Fiber | ¼ to ¾ inch per minute |
| Mandrel Temperature | 875° C. to 1100° C. |

Forming the Second LMA Optical Fiber Bending Configuration

An important aspect of the present invention involves forming annealed LMA optical fiber 12' in a first bending configuration that has substantially no axial strain as described above, and then deploying it at a second bending configuration. The second bending configuration is used to control the axial strain profile imparted to the annealed (and substantially strain-free) LMA optical fiber 12'. The maximum strain on any section of LMA optical fiber 12' taken from $R_{B1}$ to $R_{B2}$ is in direct proportion to the change of curvature. That is to say, it is proportional to $(1/R_{B2})-(1/R_{B1})$.

Because there is a large number of possible combinations of first and second bending configurations available, there is a large number of axial strain profiles that can be formed in annealed LMA optical fiber 12'. This approach thus provides tremendous flexibility in obtaining a desired axial strain profile and largely decouples the strain profile from other considerations of fiber mechanics and reliability. In particular, by decoupling the fiber axial strain profile from the fiber deployment radius, it becomes possible to independently control SBS mitigation (mediated by fiber strain) and mode stripping, which is a path length effect resulting from fiber bending independent of axial strain.

Figure 5:
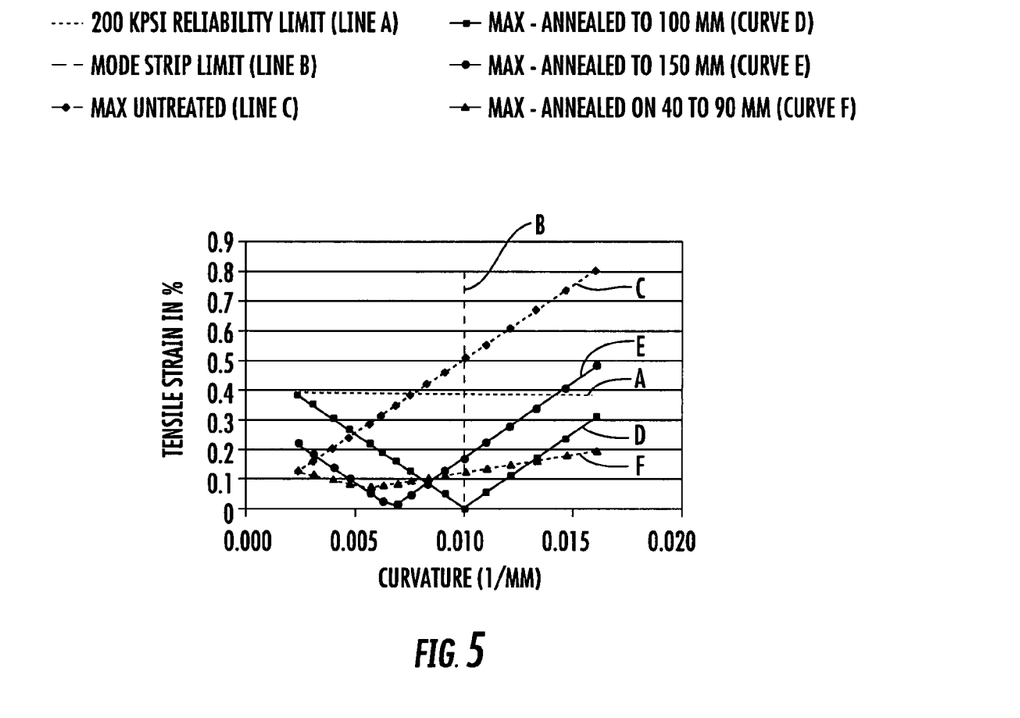
FIG. 5 is a plot of the tensile strain (%) vs. the curvature (1/mm) for an LMA optical fiber, illustrating the amount of axial strain in the annealed LMA optical fiber for a variety of first and second bending configurations, and also showing an example of an unannealed LMA optical fiber.

FIG. 5 is a plot of the "strain-curvature 2-space" which plots the tensile strain (%) vs. fiber curvature (1/mm) for example annealed LMA optical fibers 12'. An example LMA optical fiber 12 without strain management is also shown by way of contrast. The LMA strain-management process of the present invention, which involves annealing the LMA optical fiber at a first bending configuration and deploying it at a second bending configuration, allows one to select a position in the strain-curvature 2-space of FIG. 5 that is advantageous for carrying high-power light in a single mode while mitigating SBS.

Prior to exploring further the details of the plot of FIG. 5, it is worth first considering a few example bending-configuration combinations suitable for use in the present invention.

Figure 6A:
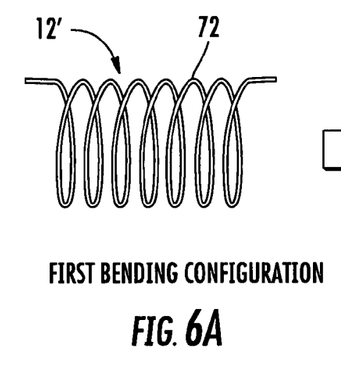
FIG. 6A and FIG. 6B are perspective views of an annealed LMA optical fiber in respective first and second bending configurations, illustrating an example embodiment wherein the first bending configuration has a constant bending radius and the second bending configuration has a constantly varying bending radius.
Figure 6B:
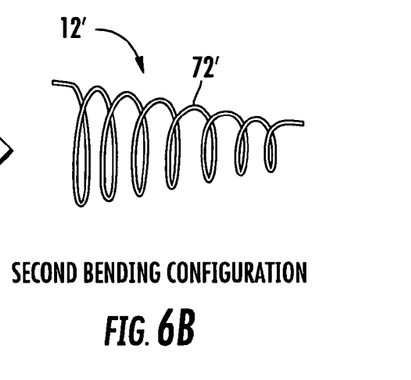

FIG. 6A and FIG. 6B are perspective views of annealed LMA optical fiber 12', illustrating an example embodiment wherein annealed LMA optical fiber 12' has coils 72 having a constant bending radius $R_{B1}$ (FIG. 6A) and is deployed in a second bending configuration having corresponding coils 72' with a constantly varying radius $R_{B2}$ (FIG. 6B).

Figure 6C:
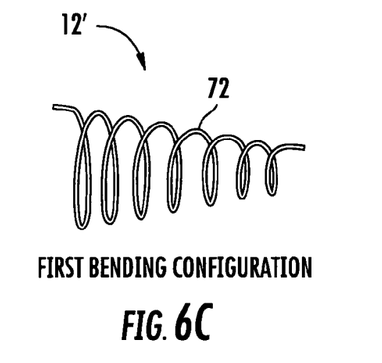
FIG. 6C and FIG. 6D are perspective views similar to FIGS. 6A and 6B, but illustrating an example embodiment wherein the first bending configuration has a constantly varying bending radius and the second bending configuration has a constant bending radius.
Figure 6D:
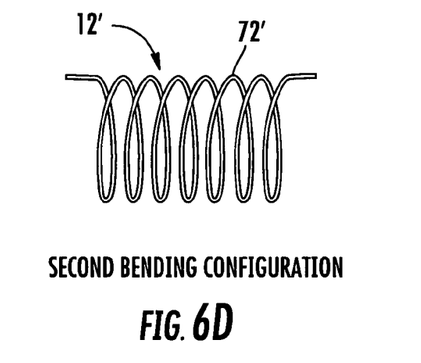

FIG. 6C and FIG. 6D are perspective views similar to FIGS. 6A and 6B, illustrating an example embodiment wherein annealed LMA optical fiber 12' with coils 72 having a constantly varying bending radius $R_{B1}$ (FIG. 6C) and is deployed in a second bending configuration having corresponding coils 72' with a constant radius $R_{B2}$ (FIG. 6D).

Figure 6E:
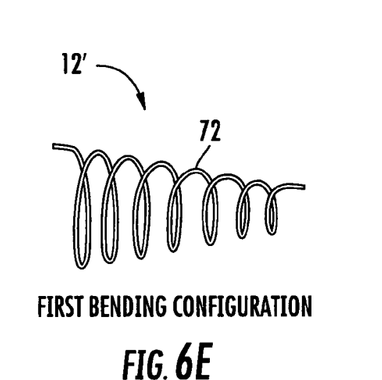
FIG. 6E and FIG. 6F are perspective views similar to FIGS. 6C and 6D, but illustrating an example embodiment wherein the first and second bending configurations have a different constantly varying bending radii.
Figure 6F:
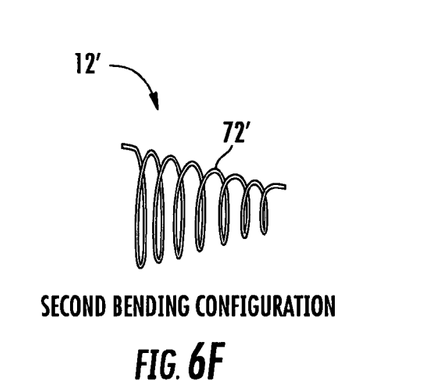

FIG. 6E and FIG. 6F are perspective views similar to FIGS. 6C and 6D, illustrating an example embodiment wherein annealed LMA optical fiber 12' with coils 72 having a constantly varying bending radius $R_{B1}$ (FIG. 6E). LMA optical fiber 12' is deployed in a second bending configuration having corresponding coils 72' with a constantly varying radius $R_{B2}$ different from the constantly varying radius $R_{B1}$ (FIG. 6F), thereby changing the effective slope of the strain vs. curvature.

Placing LMA optical fiber 12' into a second bending configuration that differs from its initial annealed bending configuration opens new design space for SBS mitigation, which in turn allows for increasing the maximum power that can be carried by the LMA optical fiber while also maintaining single-mode operation.

With reference again to FIG. 5, a horizontal dotted line (line A) at a tensile strength of 0.4% represents the 200 kpsi reliability limit and represents the accepted practice of setting this limit at ⅕ of the strain that exists under 200 kpsi proof-testing. The vertical dashed line (line B) at a curvature of 0.010 (which represents a bending radius of 50 mm) is the "mode strip" (MS) limit. At curvatures below the MS limit (i.e., to the left of line B), the mode-stripping process becomes inefficient for present-generation LMA optical fibers and the LMA optical fiber operates in the undesired multimode regime.

The dashed line with solid diamonds (line C) is the simple curvature-to-strain relationship at the point of maximum tension in an unannealed LMA optical fiber 12 having a 1 mm diameter. Note that line C crosses the 200 kpsi reliability limit to the right of the MS threshold, which means that this fiber does support a single mode within the acceptable range of curvatures.

Consider now the solid curve with solid squares (curve D) that represents an annealed LMA optical fiber having a number of constant-radius coils 72 each with a curvature of 0.01 mm (e.g., $R_{B1}$=50 mm). From the plot, at a curvature of 0.01 ($R_{B1}$=50 mm), the tensile strain is 0, as expected, since this corresponds to its first bending configuration. The other curvatures for this LMA optical fiber represent second bending configurations wherein coils 72 are constrained to form coils 72' having a different but constant bending radius $R_{B2}$, similar to the example described above in connection with FIG. 6A and FIG. 6B. Suitable bending curvatures are those to the right of the MS curvature limit (line B) of 0.010. For a curvature of 0.005 (e.g., $R_{B2}$=100 mm), the tensile strain is about 27.5%, while at a curvature of 0.0025 (e.g., $R_{B2}$=200 mm), the tensile strain is just under 40%, and at a curvature of 0.0075 (e.g., $R_{B2}$=66.6 mm), the tensile strain is about 10%. Thus, this LMA optical fiber 12' provides a relatively large range of suitable axial strains within the allowed region of the strain-curvature 2-space, while also providing for single-mode operation due to mode-stripping.

Different first bending configurations for annealed LMA optical fiber 12' allow access to the different regions of the strain-curvature 2-space. For example, the solid curve with solid circles (curv$_e$ F) illustrates an example embodiment of an annealed LMA optical fiber 12' having a number of coils with R$_{B1}$=75 mm. Note again that at a curvature of about 0.007 the tensile strain is zero because this is the curvature at which the LMA optical fiber was annealed. However, at a second bending configuration that has a curvature of 0.01 (R$_{B2}$=50 mm) the tensile strain is about 18%. Likewise, at a second bending configuration that has a curvature of 0.0025 (R$_{B2}$=200 mm), the tensile strain again is about 18%.

The solid curve with triangles (curve F) represents an example where annealed LMA optical fiber 12' was annealed on a tapered mandrel 20 in apparatus 10 (FIG. 1) having a radius that varies from 20 mm to 45 mm. The tensile strain associated with this annealed LMA optical fiber is about 10% for the different second bending configurations wherein the LMA optical fiber is held in constant-curvature coils ranging from a curvature of about 0.0025 to the MS limit curvature of 0.01. Thus, the tapered first bending configuration in combination with a constant-radius second bending configuration provides a relatively even amount of axial strain over the largest range of allowable curvatures while also being well below the 200 Kpsi reliability threshold.

Mandrels for Supporting LMA Optical Fiber in Second Bending Configuration

Figure 7:
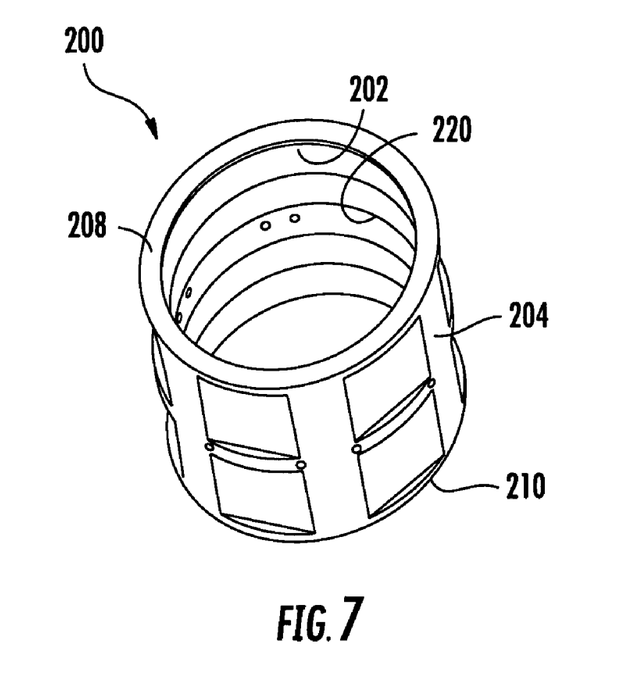
FIG. 7 is a perspective view of an example embodiment of a fiber support member in the form of a cylindrical mandrel used to support the annealed LMA optical fiber in the second bending configuration using grooves formed in the mandrel's inner surface.

There are a variety of ways to support annealed LMA optical fiber 12' in the second bending configuration. In an example embodiment, annealed LMA optical fiber 12' is held in the second bending configuration using a fiber support member. FIG. 7 is a perspective view of an example embodiment of a fiber support member in the form of a mandrel 200 used to support an annealed LMA optical fiber 12' in the second bending configuration. Mandrel 200 is a hollow constant-radius cylinder having an inner surface 202, an outer surface 204, and first and second ends 208 and 210. Inner surface 202 has formed therein a spiral groove 220 sized to accommodate a portion of LMA optical fiber 12 and that runs from first end 208 to second end 210. In an example embodiment, mandrel 200 is formed from aluminum or aluminum alloy, selected for its combination of easy machinability and excellent thermal conductivity. In the preferred embodiment some type of thermally conductive material would fill the space between fiber surface (or fiber coating) and any the mandrel channels or grooves.

Figure 8:
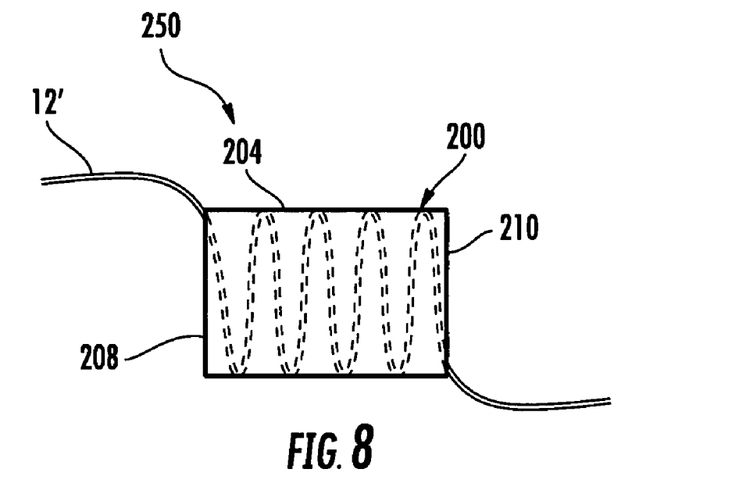
FIG. 8 is a side view of the strain-managed waveguide assembly according to the present invention that includes the LMA optical fiber supported in a constant-radius second bending configuration by the cylindrical mandrel of FIG. 7.

FIG. 8 is a side view of an example embodiment of a strain-managed waveguide assembly 250 according to the present invention. Assembly 250 includes an annealed LMA optical fiber 12' supported by the cylindrical mandrel 200 of FIG. 7. Mandrel 200 holds annealed LMA optical fiber 12' in a second bending configuration that creates axial strain in the LMA optical fiber while also providing sufficient bending so that mode stripping allows the annealed LMA optical fiber to operate in a single mode.

In an example embodiment where annealed LMA optical fiber 12' is supported by mandrel inner surface 202, the annealed LMA optical fiber spring-engages with the inner surface so as to remain fixed within grooves 220. This arrangement takes advantage of a property of most optical fibers wherein, when a fiber is coiled, a mechanical spring restoring force is created that seeks to uncoil the fiber. Thus, for the typical bending radii R$_{B2}$ associated with second bending configurations (e.g., typically from about 5 mm to about 100 mm), the spring force is sufficiently large to hold the fiber within grooves 220. In an example embodiment, additional securing means, such as tape, glue, a snug fit to the grooves, etc., can be used to further ensure that annealed LMA optical fiber 12' remains within grooves 220, which additional securing means would ideally perform the function of thermally coupling the fiber to the mandrel.

Figure 9:
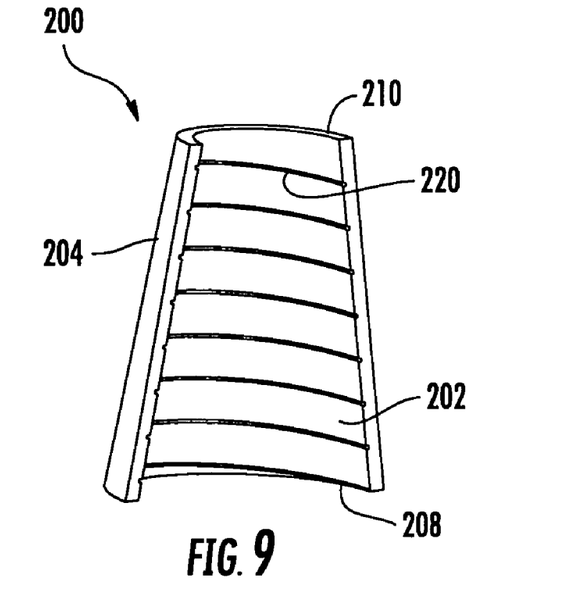
FIG. 9 is a cut-away view of an example embodiment of a tapered mandrel used to support the LMA optical fiber in a varying-radius second bending configuration using grooves formed in the mandrel's inner surface.

FIG. 9 is a cut-away side view of an example embodiment of a tapered version of mandrel 200 that provides a constantly varying radius R$_{B2}$. Like mandrel 200 of FIG. 7, the tapered mandrel is hollow and includes an inner surface 202 with grooves 220 that support annealed LMA optical fiber 12'.

In an example embodiment, mandrel 200 has sufficient thermal mass and thermal conductivity to provide for thermal management of heat dissipated by LMA optical fiber 12' when it carries large amounts of optical power. In an example embodiment, mandrel 200 is formed from schedule 80 aluminum pipe, the exterior of which has been machined to have a series of flat surfaces for the coupling of thermal insulators, passive cooling fins or cold plates through which cooling water can be piped.

Figure 10:
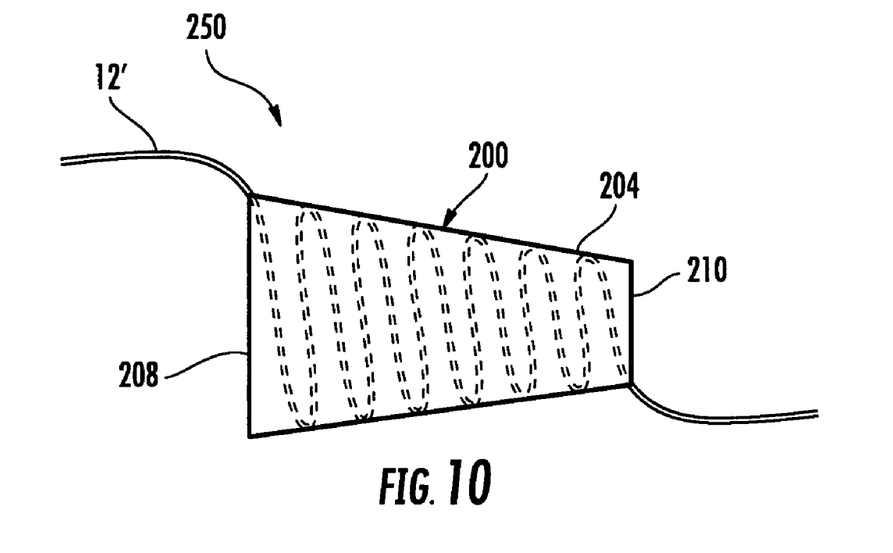
FIG. 10 is a side view of the strain-managed waveguide assembly according to the present invention that includes the LMA optical fiber supported in a varying-radius second bending configuration by the tapered mandrel of FIG. 9.

FIG. 10 is a side view of an example embodiment of a strain-managed waveguide assembly 250 according to the present invention that includes an annealed LMA optical fiber 12' and the tapered mandrel 200 of FIG. 9. In an example embodiment, tapered mandrel 200 of FIG. 9 is used to hold the annealed LMA optical fiber 12' in a second bending configuration wherein radius R$_{B2}$ varies continuously. This creates an axial strain in annealed LMA optical fiber 12' that mitigates SBS, while also providing sufficient bending so that mode stripping allows the annealed LMA optical fiber to operate in a single mode.

Temperature Control for Mitigating SBS

Figure 11A:
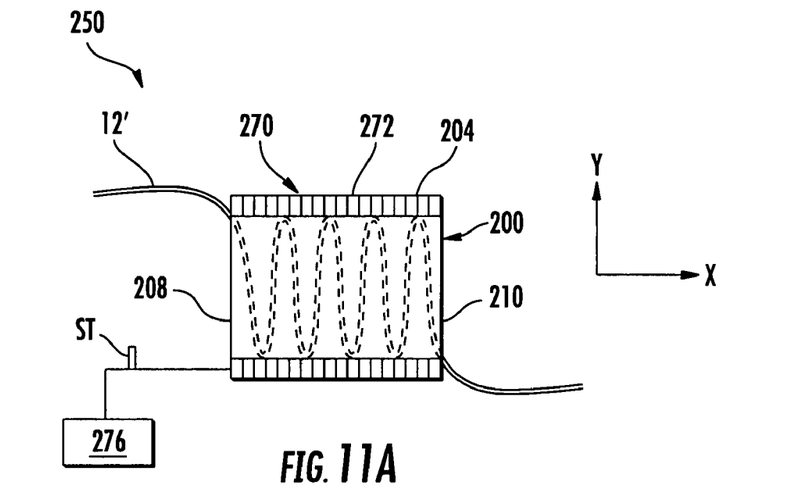
FIG. 11A is a schematic side view similar to FIG. 8, but wherein the assembly includes a temperature control system for controlling the temperature of the LMA optical fiber supported by the mandrel in a manner that mitigates SBS.

Temperature variations along the length of an optical fiber can be used to mitigate the adverse effects of SBS. FIG. 11A is a schematic side view of the strain-managed waveguide assembly 250 similar that of FIG. 8, but wherein the assembly includes a temperature control system for controlling the temperature of the LMA optical fiber 12' supported by the mandrel to mitigate SBS. X-Y Cartesian coordinates are also shown in FIG. 11A for the sake of reference. In the present example embodiment, mandrel 200 is preferably thermally conductive so that the temperature profile maintained in the mandrel is communicated to LMA optical fiber 12' supported thereby.

The temperature control system includes, in an example embodiment, an array 270 of temperature control elements 272 that surround at least a portion of mandrel outer surface 204 so as to be in thermal communication therewith. Temperature control elements 272 can be, for example, heating elements or cooling elements. Temperature control elements 272 in the form of cooling elements may be used, for example, in cases where mandrel 200 is heated from thermal energy dissipated by LMA optical fiber 12' when the LMA optical fiber carries large amounts of optical power.

Array 270 is electrically coupled to a temperature controller 276 that sends electrical control signals ST to the array to provide a select amount of heating and/or cooling to mandrel 200. While thermal diffusion throughout the body of mandrel 200 generally prevents sharp thermal gradients from being maintained, suitable variations in temperature can be sustained over the mandrel so that annealed LMA optical fiber 12' supported therein can have a suitable thermal profile maintained along its length. Numerical modeling indicates that an approximately linear temperature gradient of ~120° C. over a 6 meter length of a 40 um core fiber with a high SBS threshold refractive index profile can achieve ~2000W of output power.

Figure 11B:
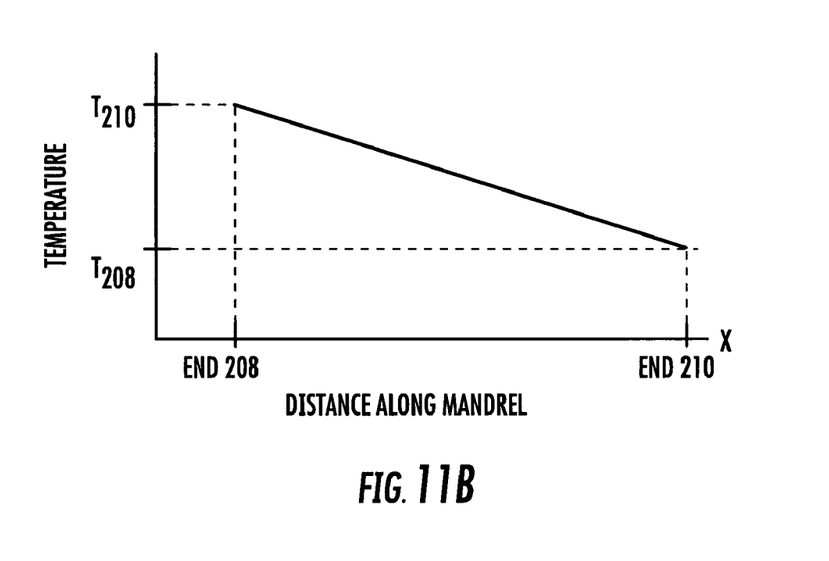
FIG. 11B is a plot of an example linear thermal gradient sustained in the mandrel and thus in the LMA optical fiber supported thereby using the temperature control system illustrated in FIG. 11A.

FIG. 11B illustrates an example embodiment of linear thermal profile maintained over the length of mandrel 200 between ends 208 and 210 (e.g., in the X-direction). In other example embodiments, other thermal profiles are employed, such as those that vary in the Y direction, or both the X and Y directions.

Figure 11C:
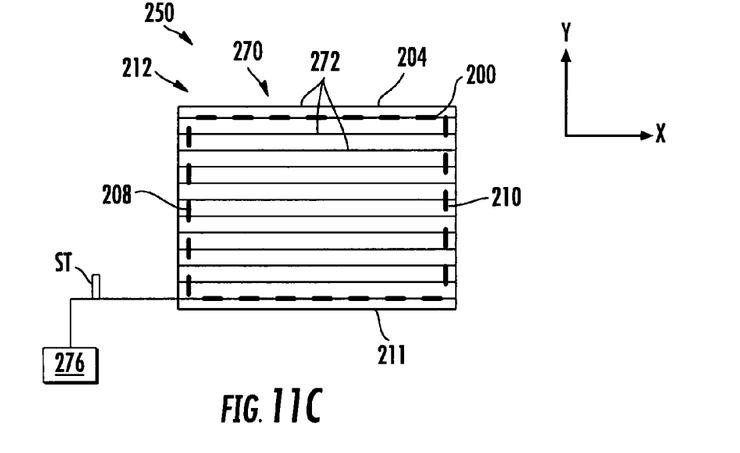
FIG. 11C is a schematic side view of the strain-managed waveguide assembly similar that of FIG. 11A, but wherein annealed LMA optical fiber is not shown, and wherein the temperature control system forms a temperature gradient in the Y-direction.
Figure 11D:
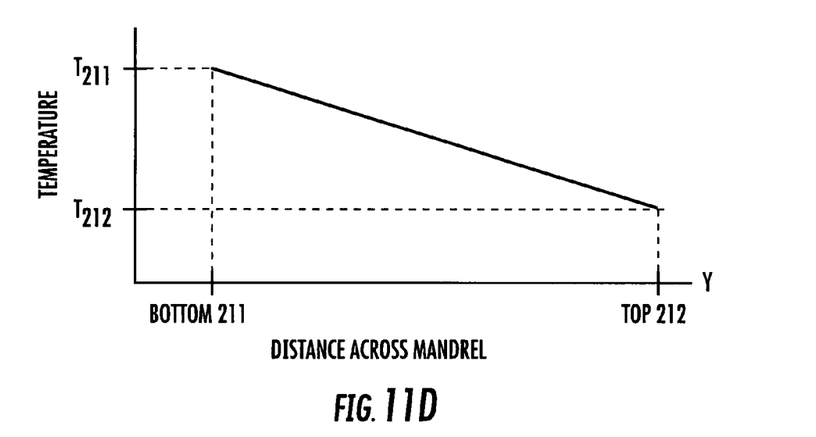
FIG. 11D is a plot similar to that of FIG. 11B but for of an example linear thermal gradient sustained across the mandrel in the Y-direction.
Figure 11E:
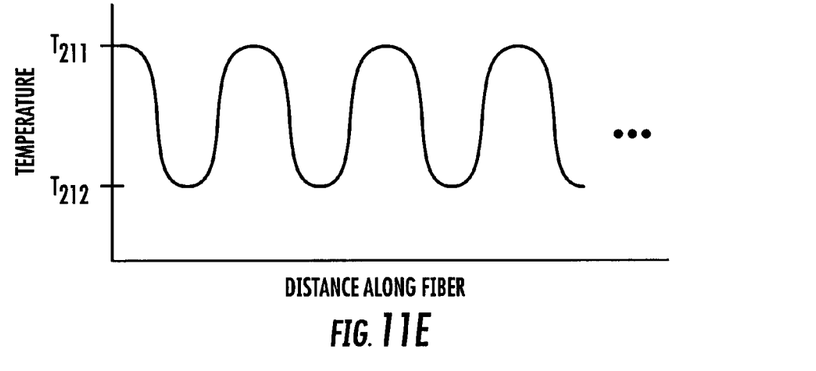
FIG. 11E is an idealized plot of the periodic temperature profile formed along the LMA optical fiber by the temperature control system of FIG. 11C.

FIG. 11C is a schematic side view of the strain-managed waveguide assembly 250 similar that of FIG. 11A, but wherein annealed LMA optical fiber 12' is not shown, and wherein the temperature control system includes temperature control elements 272 that run the length of the mandrel (i.e., in the X-direction) so that the temperature control system can form a temperature gradient in the Y-direction. FIG. 11D illustrates an example embodiment of linear thermal profile maintained in the Y-direction between the mandrel bottom portion 211 and mandrel top portion 212. Because annealed LMA optical fiber 12' is arranged in a spiral within mandrel 200, the fiber periodically traverses from mandrel bottom 211 to mandrel top 212 and thus experiences a periodic change in temperature that reduces the adverse impact of SBS. Said differently, viewing mandrel 200 end on in a cylindrical coordinate system with a radius r and a polar angle θ (not shown), the temperature of the mandrel can be made to vary sinusoidally as a function of the polar angle. FIG. 11E is an idealized plot of the periodic temperature profile formed along the length of annealed LMA fiber 12' by the temperature control system of FIG. 11C.

Optical Amplifier

Figure 12:
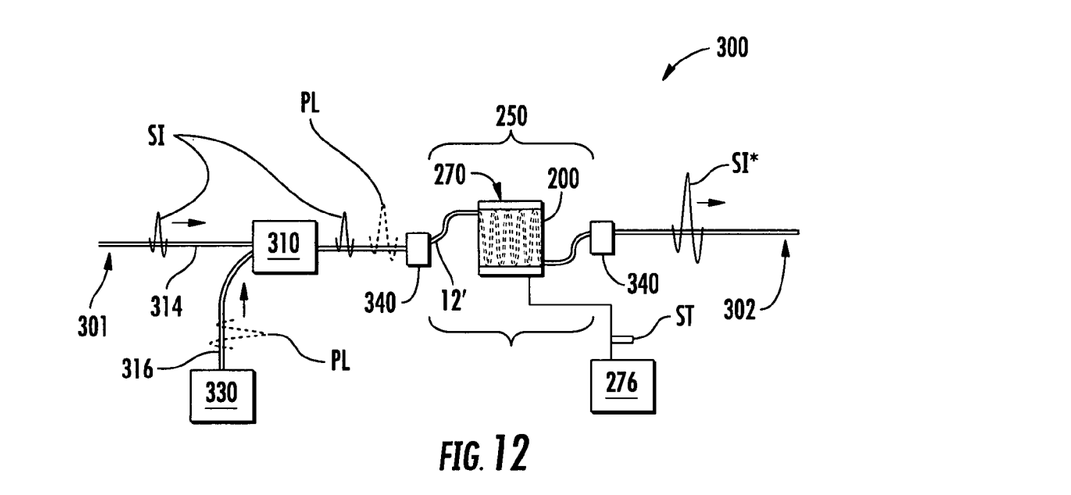
FIG. 12 is a schematic diagram of a fiber amplifier that utilizes a temperature-controlled strain-managed waveguide assembly according to the present invention.
Figure 13:
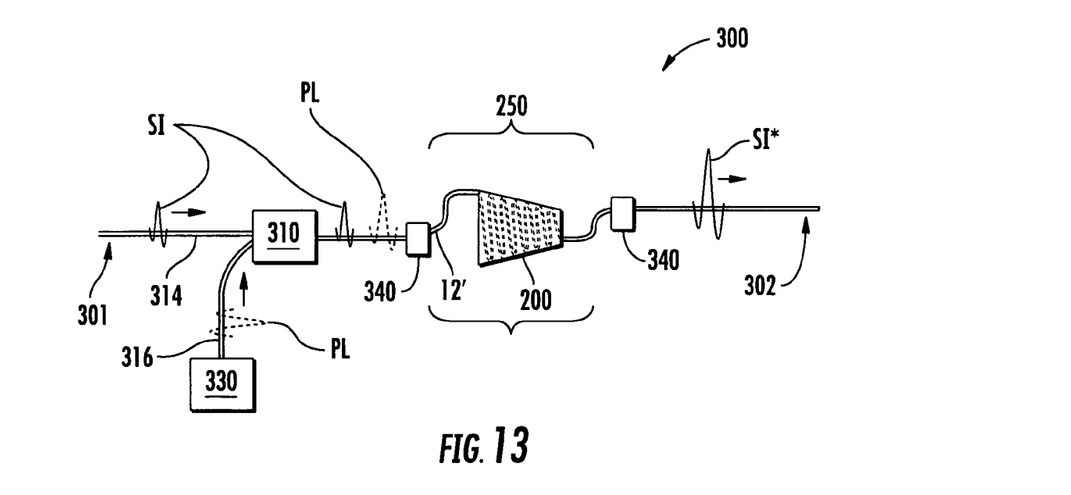
FIG. 13 is a schematic diagram of similar to FIG. 12, wherein the fiber amplifier utilizes a strain-managed waveguide assembly that includes a tapered mandrel.

FIG. 12 is a schematic diagram of an example embodiment of a fiber amplifier system 300 that uses the strain-managed waveguide assembly 250 of the present invention. In an example embodiment, strain-managed waveguide assembly 250 includes a mandrel-type fiber support member and a temperature control capability for mitigating SBS, as described above, and as shown in FIG. 12 for the sake of illustration. System 300 has an input end 301 and an output end 302. Here, strain-managed waveguide assembly 250 includes an annealed LMA optical fiber 12' having a core 13 adapted to serve as a gain medium, e.g., doped with one or more rare-earth elements such as erbium.

System 300 includes an optical coupler 310 that couples an input-signal optical fiber 314 and a pump-signal optical fiber 316 into LMA optical fiber 12'. Input-signal optical fiber 314 carries input signals SI (e.g., from an optical communications network) that are to be amplified, while pump optical fiber 316 carries pump light PL from a pump light source 330 that optically pumps the gain-medium core 13 of LMA optical fiber 12'. In an example embodiment, input signals SI have a wavelength $\lambda_I$, of between 1530 nm and 1620 nm, and pump light PL has a wavelength $\lambda_P$ of 980 nm or 1480 nm.

System 300 also optionally includes optical isolators 340 adapted to block pump light PL from traveling out of system output end 302 and also to prevent amplified light from exiting system input end 301.

In the operation of system 300, pump light PL from pump light source 330 serves to pump core gain medium 13 in strain-managed waveguide assembly 250. Input signals SI traveling on input-signal optical fiber 314 are coupled into LMA optical fiber 12' and travel through the pumped gain medium of core 13. Input signals SI stimulate the excited atoms (e.g., erbium atoms) to emit photons at the input-signal wavelength $\lambda_I$, which serves to amplify the input signal, i.e., increase the input signal power, thereby forming an amplified input signal SI*. Amplified signal SI* is then outputted at output end 302. This increase in input signal power generally results in an increase in SBS. However, because strain-managed waveguide assembly 250 provides an axial strain profile that mitigates SBS, amplified input signal SI* can have more power than other fiber amplifier systems 300 without incurring an SBS penalty.

In addition, the second bending configuration of LMA optical fiber 12' in strain-managed waveguide assembly 250 is designed to provide for mode-stripping and thus single-mode operation.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A strain-managed waveguide assembly, comprising:
   a large-mode-area (LMA) optical fiber capable of supporting multiple modes and that has a first bending configuration, having at least a first radius, wherein the LMA optical fiber has substantially no axial strain; and
   a fiber support member configured to support the LMA optical fiber in a second bending configuration, having at least a second radius, that forms within the LMA optical fiber an axial strain profile that reduces stimulated Brillouin scattering (SBS) as compared to the first bending configuration, and that also induces mode stripping that causes the LMA optical fiber to operate in a single mode.

2. The assembly of claim 1, wherein the fiber support member includes a mandrel in thermal communication with the LMA optical fiber, wherein the LMA optical fiber has a temperature, and wherein the mandrel is adapted to control the temperature of the LMA optical fiber.

3. The assembly of claim 1, further including a light source optically coupled to the LMA optical fiber.

4. The assembly of claim 1, wherein the LMA optical fiber includes a core adapted to serve as a gain medium.

5. The assembly of claim 4, further including:
   a pump light source optically coupled to the LMA optical fiber and adapted to pump the gain medium.

6. The assembly of claim 5, further including a source of input optical signals optically coupled to the LMA optical fiber and adapted to provide input optical signals into the gain medium, wherein the gain medium is adapted to optically amplify said input said input optical signals.

7. The assembly of claim 1, wherein the first bending configuration has loops with a constant bending radius, and wherein the second bending configuration has loops with a varying bending radius.

8. The assembly of claim 1, wherein the fiber support member includes an inner surface, and wherein the LMA optical fiber is supported in the second bending configuration by said inner surface.

9. The assembly of claim 1, wherein the fiber support member includes a tapered mandrel.

10. The assembly of claim 1, wherein the fiber support member is a cylindrical mandrel having a constant radius.

11. A method of forming a strain-managed waveguide assembly, comprising:
   forming a large-mode-area (LMA) optical fiber capable of supporting multiple modes into a first bending configuration, having at least a first radius, wherein the LMA optical fiber has substantially no axial strain; and
   forming the LMA optical fiber into a second bending configuration, having at least a second radius, that creates an axial strain profile within the LMA optical fiber that reduces stimulated Brillouin scattering (SBS) as compared to the first bending configuration, and that also causes the LMA optical fiber to operate in a single mode.

12. The method of claim 11, wherein forming the first bending configuration includes heating the LMA optical fiber and wrapping the heated LMA optical fiber around a first mandrel.

13. The method of claim 12, wherein the first mandrel is a cylinder of constant radius.

14. The method of claim 11, wherein forming the second bending configuration includes supporting the LMA optical fiber with a fiber support member.

15. The method of claim 14, further including:
conducting guided light with the LMA optical fiber, wherein a portion of said guided light is absorbed by the LMA optical fiber so as to heat the LMA optical fiber; and
placing the fiber support member and the LMA optical fiber in thermal communication and controlling said heating of the LMA optical fiber using said fiber support member.

16. The method of claim 14, including providing the LMA optical fiber in the form of a double-clad LMA optical fiber that has a glass outer cladding.

17. The method of claim 14, further including:
providing the fiber support member in the form of a second mandrel having a continuously varying radius; and
supporting the LMA optical fiber with said second mandrel so as to impart a constantly varying axial strain in the LMA optical fiber.

18. The method of claim 11, wherein the LMA optical fiber includes a core adapted to serve as a gain medium, and further including optically pumping the gain medium.

19. An optical fiber amplifier for amplifying input light signals, comprising:
a large-mode-area (LMA) optical fiber having a core adapted to serve as a gain medium capable of amplifying said input light signals, said LMA optical fiber capable of supporting multiple modes and that has a first bending configuration, having at least a first radius, wherein the LMA optical fiber has substantially no axial strain;
a fiber support member configured to support the LMA optical fiber in a second bending configuration, having at least a second radius, that forms in the LMA optical fiber an axial strain profile that reduces stimulated Brillouin scattering (SBS) as compared to the first bending configuration, and that also causes the LMA optical fiber to operate in single mode; and
a pump light source adapted to optically pump said gain medium.

20. The optical amplifier of claim 19, further including a temperature control system operably coupled to the fiber support member so as provide the LMA optical fiber supported thereby with a temperature profile that mitigates SBS.

21. A strain-managed waveguide assembly, comprising:
an optical fiber that has a first bending configuration, having at least a first radius, wherein the optical fiber has substantially no axial strain; and
a fiber support member configured to support the optical fiber in a second bending configuration, having at least a second radius, that forms within the optical fiber an axial strain profile.

22. The assembly of claim 21, wherein the optical fiber is a large-mode-area (LMA) optical fiber.

23. The assembly of claim 21, wherein the fiber support member includes a mandrel.

24. The assembly of claim 21, wherein the optical fiber is multimode, and wherein the second bending configuration induces mode stripping that causes the optical fiber to operate in a single mode.

25. The assembly of claim 21, wherein the second bending configuration reduces stimulated Brillouin scattering (SBS) as compared to the first bending configuration.

* * * * *